Patented Mar. 5, 1935

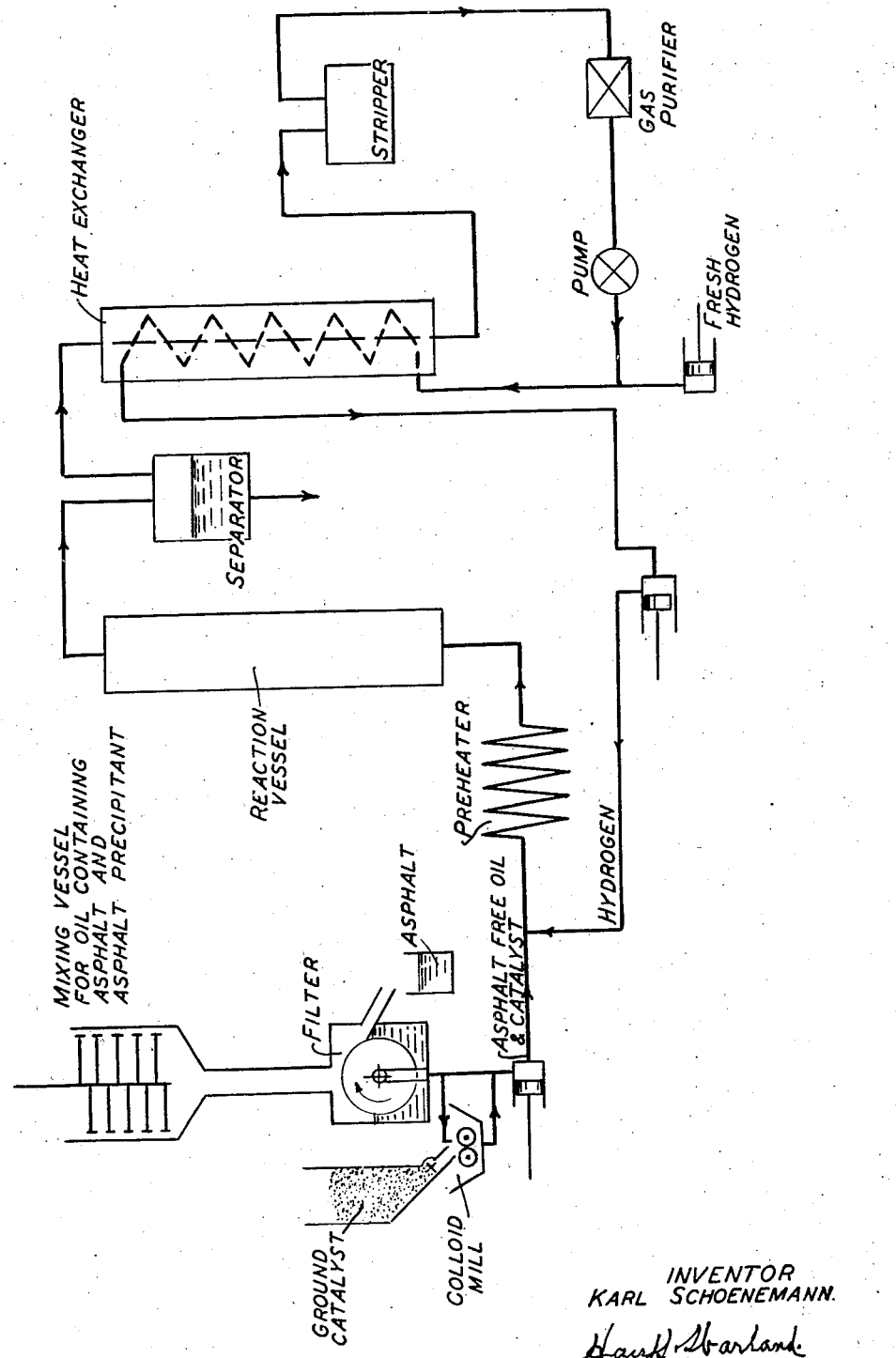

1,993,386

UNITED STATES PATENT OFFICE 1,993,386

PRODUCTION OF VALUABLE HYDRO-CARBON LIQUIDS

Karl Schoenemann, Heidelberg, Germany, assignor to I. G. Farbenindustrie Aktiengesellschaft, Frankfort-on-the-Main, Germany Application August 26, 1931, Serial No. 559,486
In Germany September 4, 1930

4 Claims. (Cl. 196—53)

The present invention relates to improvements in the production of valuable hydrocarbon liquids from higher boiling liquid hydrocarbon products containing asphaltic or resinous matter, such as tars, mineral oils or their distillation products.

In the destructive thermal treatment of asphaltic liquid substances, such as producer tar, crude mineral oils and the like, especially by cracking or destructive hydrogenation, difficulties are frequently encountered by reason of the great sensibility to heat of the high molecular asphaltic and resinous substances contained in the initial materials. The decomposition of the said substances usually takes place below the temperatures at which the remaining hydrocarbons react and leads to deposits of carbon on the catalyst and on the walls of the vessel, to the formation of rapidly growing coking nuclei, to the separation of small coke which clogs the apparatus, and to other objections. These objections are less in the case of destructive hydrogenations carried out with suitable catalysts and under mild conditions at which no appreciable splitting takes place; in this manner the aliphatic substances may even be converted into oils of high boiling point without the formation of coke.

I have now found that valuable liquid hydrocarbons are obtained without the said difficulties from higher boiling liquid hydrocarbon products, such as tars, petroleums, hydrogenation products of coals, their residues, conversion products and the like which contain heat-sensitive substances of high molecular weight, such as asphaltic and resinous substances, which readily decompose with the deposition of carbon, even by cracking and/or destructive hydrogenation, that is by such a hydrogenation that considerable amounts of hydrocarbons of comparatively low boiling point are obtained, by first wholly or partly separating from the initial materials the readily decomposable asphaltic and resinous substances by treatment with organic liquid precipitants and, if desired, in addition thereto, with electrolytes causing a coagulation of the said substances, and only then subjecting the initial materials, which have thus been freed from the said injurious substances, to the said destructive thermal treatment.

Among the organic precipitants suitable for effecting the said separation may be mentioned the organic liquids, in which asphaltic or resinous solvents are insoluble, as for example liquid hydrocarbons saturated with hydrogen, e. g. saturated aliphatic or hydroaromatic hydrocarbons such as petroleum distillates or hydrogenation products rich in hydrogen, benzine, paraffin oil or gas oil or alcohols or esters. As examples of electrolytes which may be added to cause a coagulation of the said resinous and asphaltic substances may be mentioned solutions having an acid reaction, such as solutions of inorganic or organic acids, such as hydrogen chloride, sulphuric acid or phosphoric acid in water or in organic solvents such as benzine, or acid salts or solutions thereof, as for example aluminium chloride or solutions of potassium bisulphate or also neutral solutions, such as that of sodium chloride. The amount of the said precipitating or coagulating agent to be added will depend on the nature of the materials to be treated and on the nature of the precipitant employed. Thus less of the precipitant is required when employing hydrocarbons rich in hydrogen, than when employing hydrocarbons relatively poor in hydrogen. Again, the amount of precipitant should be decreased the greater the asphaltic character of the materials undergoing treatment. The asphaltic character of a substance increases with its molecular weight, with its insolubility in aliphatic hydrocarbons with the capability of its being decomposed into coky substances by thermal treatment, and with its depth of color. In case electrolytes are added to the materials containing asphalts and resins the hydrocarbon supplied as precipitant may be poorer in hydrogen and employed in smaller amounts than when electrolytes are dispensed with.

Usually an addition of about 20 to 100 per cent by weight of the organic precipitant will suffice for precipitating the asphalts contained in tars or residues of mineral oils, but to cause a quantitatively complete separation of the remaining small amounts of asphaltic matter, which do not have a deleterious influence, considerably large amounts of the precipitant will usually be required. The following is a list of materials in the order in which any member of the series usually requires an amount of precipitant greater than that preceding it:—Pit coal low temperature tar, brown coal producer tar, residues of mineral oils with asphaltic base (Panuco oils), brown coal low temperature carbonization tar and the viscid high boiling fraction of the destructive hydrogenation of pit coal which fraction in only distillable by steam distillation in vacuo. Particularly when adding coagulating agents to the initial materials, which latter are subsequently to be thermally treated, a solvent such as benzene, which does not have a precipitating action on asphaltic and resinous substances may be mixed with the said initial materials in order to reduce their viscosity and facilitate the separation of the said substances.

The substances which are precipitated or coagulated may be in the form of granular flocks of asphaltum, or in the form of tacky substances capable of being drawn out to threads, and may be separated by filtration, centrifuging or decantation. In some cases, especially when employing precipitants of high boiling point, such as gas oil, it may be advantageous to dispense with the recovery of the asphalt precipitant from the crude material freed from asphalt and to work up the mixture, as for example when the asphalt is precipitated from producer tar by means of gas oil or from mineral coal tar by means of brown coal low temperature carbonization tar.

When the crude materials contain insoluble constituents, such as ashes and dust, it is preferable first to filter them off or to precipitate them together with a small part of the asphalt. The main portion of the asphalt is thus obtained free from ashes. When employing not too energetic hydrogenating or cracking conditions it may be preferable only to remove the very readily decomposable asphaltic substances having the highest molecular weight.

The subsequent treatment of the crude materials freed from asphalt consists either of a cracking under any desired pressure, with or without catalysts, or of a destructive hydrogenation carried out with catalysts or without catalysts. The said catalysts may be in a finely dispersed state, such as in a suspended or dissolved state. The difficulties attributable to the decomposability of the asphalt or the like do not occur. Moreover the products obtained are distinguished from the products obtained from the crude initial materials not freed from asphalt by being of better quality. A further advantage consists in the fact that the consumption of hydrogen in the hydrogenation is small.

The asphaltic substances separated may be employed as road asphalt, briquette pitch or in some cases as a heating oil or for similar purposes, depending on the source from which they are obtained.

A suitable apparatus for carrying out my process is shown in the accompanying drawing to which are applied sufficient legends of suitable character to render further description thereof unnecessary.

The following examples will further illustrate the nature of this invention but the invention is not restricted to these examples.

Example 1

A distillation residue, similar to soft pitch, obtained from brown coal producer tar, which when cracked in a column causes strong incrustation of the apparatus and the cracking residue of which contains 30 per cent of constituents insoluble in benzene is mixed at 80° C. with 70 per cent by weight of a petroleum benzine boiling between 100° and 150° C. while stirring. The asphalt which thus separates in the form of granular flocks is allowed to settle and the benzine solution is decanted. By distilling off the benzine, a residue consisting of 20 per cent of asphalt and 80 per cent of tar free from asphalt is obtained which may be cracked without coking and with a minimum amount of incrustation.

Example 2

25 per cent by weight of an American gas oil, having a specific gravity of 0.850 at 20° C., are added to the soft pitch specified in Example 1. The precipitated asphalt is filtered off and the pitch poor in asphalt is subjected to a destructive hydrogenation in the usual manner together with the gas oil.

Example 3

100 kilograms of a tacky, extremely viscid, very high boiling fraction of a product of the destructive hydrogenation of pit coal which fraction has a specific gravity of 1.11 and contains 5 per cent of asphaltic substances and which is only distillable by steam distillation in vacuo, are dissolved in 100 kilograms of benzine. The solution thus obtained is then stirred for about 5 minutes with 20 kilograms of waste sulphuric acid of 10 per cent strength. 30 kilograms of highly viscid resinous substances are deposited having a specific gravity of 1.14 and containing 15 per cent of asphaltum and 20 per cent of phenols. After allowing these to settle the said deposits are separated off. The sulphuric acid employed, which forms a layer, is also separated off and is recovered almost completely with its concentration substantially unchanged. After washing the oils thus treated with water the benzine is distilled off therefrom. The product recovered has a specific gravity of 1.1 and contains only 1 per cent of asphaltum only very slightly susceptible to high temperatures. It is treated at a temperature of about 510° C. under a pressure of about 100 atmospheres of hydrogen in the presence of a finely divided mixture of iron and aluminium oxide. The product obtained consists for the most part of petrol and no formation of coke or congestion of the apparatus takes place such as would occur without the removal of the said asphaltic substances.

What I claim is:

1. A process for the production of valuable liquid hydrocarbons from a higher boiling liquid hydrocarbon product containing asphaltic and resinous substances which comprises separating at least partly the said asphaltic and resinous substances from the said product by adding to the latter an organic liquid capable of precipitating said substances and an electrolyte capable of coagulating said substances, and then subjecting the product freed from the precipitated substances to a destructive thermal treatment yielding lower boiling hydrocarbons.

2. A process for the production of valuable liquid hydrocarbons from a higher boiling liquid hydrocarbon product containing asphaltic and resinous substances which comprises separating at least partly the said asphaltic and resinous substances from the said product by adding to the latter an organic liquid capable of precipitating said substances and a solution of an acid capable of coagulating said substances, and then subjecting the product freed from the precipitated substances to a destructive thermal treatment yielding lower boiling hydrocarbons.

3. A process for the production of valuable liquid hydrocarbons from a higher boiling liquid hydrocarbon product containing asphaltic and resinous substances which comprises separating at least partly the said asphaltic and resinous substances from the said product by adding to the latter a liquid hydrocarbon capable of precipitating said substances and an aqueous solution of an acid capable of coagulating said substances, and then subjecting the product freed from the precipitated substances to a destructive thermal treatment yielding lower boiling hydrocarbons.

4. A process for the production of valuable liquid hydrocarbons from a higher boiling liquid hydrocarbon product containing asphaltic and resinous substances which comprises separating at least partly the said asphaltic and resinous substances from the said product by adding to the latter a liquid hydrocarbon capable of precipitating said substances and an aqueous solution of sulphuric acid to coagulate said substances, and then subjecting the product freed from the precipitated substances to a destructive hydrogenation in the presence of a finely dispersed destructive hydrogenation catalyst.

KARL SCHOENEMANN.